United States Patent
Cao et al.

(10) Patent No.: US 11,754,535 B2
(45) Date of Patent: Sep. 12, 2023

(54) ULTRASONIC IN-SITU AUTOMATIC DETECTION SYSTEM FOR CREEP CRACKS ON INNER WALL OF HYDROGEN PRODUCTION FURNACE TUBE

(71) Applicants: China Special Equipment inspection and Research Institute, Beijing (CN); Beijing University of Technology, Beijing (CN)

(72) Inventors: Luowei Cao, Beijing (CN); Zhongtian Lyu, Beijing (CN); Yan Lyu, Beijing (CN); Cunfu He, Beijing (CN); Guorong Song, Beijing (CN); Zhiyuan Han, Beijing (CN)

(73) Assignees: China Special Equipment Inspection and Research Institute, Beijing (CN); Beijing University of Technology, Beijing (CN)

( * ) Notice: Subject to any disclaimer, the term of this patent is extended or adjusted under 35 U.S.C. 154(b) by 168 days.

(21) Appl. No.: 17/388,266

(22) Filed: Jul. 29, 2021

(65) Prior Publication Data

US 2022/0120713 A1  Apr. 21, 2022

(30) Foreign Application Priority Data

Oct. 16, 2020 (CN) .......................... 202011105828.5

(51) Int. Cl.
*G01N 29/265* (2006.01)
*G01N 29/04* (2006.01)
(Continued)

(52) U.S. Cl.
CPC .......... *G01N 29/265* (2013.01); *G01N 29/04* (2013.01); *G01N 29/2437* (2013.01);
(Continued)

(58) Field of Classification Search
CPC ..... G01N 2291/023; G01N 2291/0234; G01N 2291/0258; G01N 2291/0289;
(Continued)

(56) References Cited

U.S. PATENT DOCUMENTS

| | | | | |
|---|---|---|---|---|
| 5,549,004 A | * | 8/1996 | Nugent | G01N 29/2487 73/624 |
| 2011/0012661 A1 | * | 1/2011 | Binder | A63H 33/08 307/41 |
| 2015/0308981 A1 | * | 10/2015 | Fisher | G01N 29/04 73/168 |

FOREIGN PATENT DOCUMENTS

| | | | |
|---|---|---|---|
| CN | 2358452 Y | * | 8/1996 |
| CN | 203431506 U | * | 2/2014 |

(Continued)

OTHER PUBLICATIONS

Danielle Collins, What are coreless DC motors?, Motion Control Tips (Year: 2018).*

(Continued)

*Primary Examiner* — David L Singer
(74) *Attorney, Agent, or Firm* — Myers Bigel, P.A.

(57) ABSTRACT

An ultrasonic in-situ automatic detection system for creep cracks on an inner wall of a hydrogen production furnace tube. The system comprises a computer, a multi-channel ultrasonic system control circuit, a motor driver board, a coreless motor, and a tube crawling machine. Multi-channel piezoelectric transducers are arranged in a circumferential direction of the furnace tube. The computer is configured to send detection instructions to the multi-channel ultrasonic system control circuit through a wireless network; the multi-channel ultrasonic system control circuit is configured to control multiple channels to simultaneously excite the piezoelectric transducers, receive echo signals from the piezoelectric transducers and then send the echo signals back to (Continued)

the computer in a wireless mode; and the motor driver board is configured to drive the coreless motor to drive the tube crawling machine to move, receive motion parameters fed back by motor encoders, and send the motion parameters back to the computer.

4 Claims, 4 Drawing Sheets

(51) Int. Cl.
*G01N 29/24* (2006.01)
*G08C 17/02* (2006.01)
*H04L 5/14* (2006.01)
*G01N 29/34* (2006.01)
*H04W 84/12* (2009.01)
*G01N 29/22* (2006.01)

(52) U.S. Cl.
CPC ....... *G01N 29/2481* (2013.01); *G01N 29/343* (2013.01); *G01N 29/348* (2013.01); *G08C 17/02* (2013.01); *H04L 5/14* (2013.01); *G01N 29/225* (2013.01); *G01N 2291/023* (2013.01); *G01N 2291/0234* (2013.01); *G01N 2291/0258* (2013.01); *G01N 2291/0289* (2013.01); *G01N 2291/044* (2013.01); *G01N 2291/106* (2013.01); *G01N 2291/26* (2013.01); *G01N 2291/2634* (2013.01); *H04W 84/12* (2013.01)

(58) Field of Classification Search
CPC ....... G01N 2291/044; G01N 2291/106; G01N 2291/26; G01N 2291/2634; G01N 29/04; G01N 29/225; G01N 29/2437; G01N 29/2481; G01N 29/265; G01N 29/343; G01N 29/348; G08C 17/02; H04L 5/14; H04W 84/12
See application file for complete search history.

(56) References Cited

FOREIGN PATENT DOCUMENTS

| | | | | | |
|---|---|---|---|---|---|
| CN | 104407052 | A | * | 3/2015 | |
| CN | 104502459 | A | * | 4/2015 | |
| CN | 107402255 | A | * | 11/2017 | ........... G01N 29/041 |
| CN | 107816961 | A | * | 3/2018 | ............. G01B 21/10 |
| CN | 108680647 | A | * | 10/2018 | ............. G01N 29/04 |
| CN | 109521737 | A | * | 3/2019 | |
| CN | 109709211 | A | * | 5/2019 | |
| CN | 110455921 | A | * | 11/2019 | |
| CN | 210665620 | U | * | 6/2020 | |

OTHER PUBLICATIONS

Rajkumar Sharma, High Power Bidirectional DC Motor Driver Using IFX007T, Electronics Lab (Year: 2019).*

* cited by examiner

ULTRASONIC IN-SITU AUTOMATIC DETECTION SYSTEM FOR CREEP CRACKS ON INNER WALL OF HYDROGEN PRODUCTION FURNACE TUBE

CROSS REFERENCE TO RELATED APPLICATION(S)

This patent Applications claims the benefit and priority of Chinese Patent Application No. 202011105828.5, filed on Oct. 16, 2020, the disclosure of which is incorporated by reference herein in its entirety as part of the present application.

TECHNICAL FIELD

The present disclosure relates to an in-situ detection system, and particularly relates to an ultrasonic in-situ automatic detection system for creep cracks on the inner wall of a hydrogen production furnace tube, and belongs to the field of nondestructive detection.

BACKGROUND ART

Hydrogen energy, as a clean renewable energy source, is being increasingly considered by people. Along with large-scale investment and application of the hydrogen production furnace in petrochemical oil refining enterprises, the operation state of hydrogen production furnace tubes and parts thereof is directly related to the production safety and benefits of national enterprises. A plurality of pipelines in the hydrogen production furnace work side by side, and the furnace tubes therein are main pressure-bearing parts, and cracks are inevitable due to long-time high-temperature and high-pressure environment and hydrogen oxide corrosion. Therefore, safety detection of the structure not only helps to prevent safety accidents, but also can replace problematic pipelines in time to avoid unnecessary economic loss.

The hydrogen production furnace tube is fixed between two heating furnaces in a whole row and is in a high-temperature and high-pressure production state all year round. The whole furnace may need to be stopped for 1-2 days for each detection, greatly influencing enterprise benefits. The starting and stopping of the heating furnaces may seriously influence the growth of pipeline cracks. Therefore, how to comprehensively detect pipelines in the furnace in a short time is a main problem facing at present. Currently, only in a furnace shutdown state can a detector crawl on a scaffold to perform stepping detection on a fire facing surface and a fire back surface of the furnace tube by using a longitudinal wave probe or scan the pipelines by adopting a tube crawling machine in a two-time manner. However, due to the fact that the number of pipelines in the furnace is large, the two modes are adopted in the shutdown state, the detection coverage area is small, and time and labor are consumed, the detection cost can be very huge. Therefore, in-situ automatic detection of furnace tubes, especially centrifugal casting HP40 pipelines, cannot be well implemented at present until safety in use of hydrogen production furnaces is increased, national production safety is increased, and potential safety hazards are reduced to the minimum. Research on an inner wall creep crack in-situ automatic detection system without manual detection of personnel is therefore very necessary and urgent.

The hydrogen production furnace tube is mainly made of metal elements such as nickel and chromium in a centrifugal casting mode, compared with common tubes in the market, the hydrogen production furnace tube is large in grain size and has large attenuation on transmission of various kinds of energy, and the workpieces are designed to be thick-wall pipelines in order to guarantee that the workpieces can be in a working state all year round. In order to detect the hydrogen production furnace tube, ultrasonic waves are undoubtedly the most suitable and effective detection method. Compared with other nondestructive detection methods, the ultrasonic nondestructive detection technology has comprehensive advantages for determining parameters such as the size, the position, the orientation, the burial depth and the property of internal defects, and the ultrasonic nondestructive detection technology is mainly characterized in that the ultrasonic nondestructive detection technology is high in penetrating capacity, high in signal integrity and harmless to human bodies, parts and the surrounding environment.

At present, there is relatively little research on a detection system for hydrogen production facility pipes, and a system for in-situ automatic detection of a hydrogen production furnace tube does not exist. In the prior art, a furnace tube ultrasonic detection system is disclosed with the publication number of CN110455921A. The system comprises a tightening mechanism assembly, a furnace tube and an ultrasonic detector, but the disclosed system does not relate to an in-situ automatic detection system of the furnace tube and comprises a control circuit and a motor driving system which are independently researched and developed. A multi-channel ultrasonic transducer transmission detection mode is not involved, and the device still needs manual change of the detection position and control in the detection process.

Therefore, an in-situ automatic detection system for the hydrogen production furnace tube is lacked in the prior art, system parameters do not need to be adjusted in the detection process, the problem that the detection distance is affected by too many cables in a traditional method can be solved, and remote detection can be conveniently implemented according to the actual test environment.

SUMMARY

Aiming at the defects in the prior art, the present disclosure provides an ultrasonic in-situ automatic detection system for creep cracks on the inner wall of a hydrogen production furnace tube, piezoelectric transducers are arranged in a certain manner to form a detection ring which is fixed in the circumferential direction of the furnace tube and used for detecting the creep cracks on the inner wall of the furnace tube; and detection for the creep cracks of the hydrogen production furnace tube and control of a tube crawling machine are achieved in a wireless mode, excessive operation of a detector on cables and parameters of the detection system is avoided, the detection cost is reduced while the in-situ detection problem of the furnace tube is solved, and therefore in-situ detection of the components is achieved.

To achieve the purpose, disclosed is an ultrasonic in-situ automatic detection system for creep cracks on the inner wall of a hydrogen production furnace tube. The system comprises a computer, a multi-channel ultrasonic system control circuit, a motor driver board, a coreless motor, a rotating motor, a tube crawling machine, a multi-channel piezoelectric transducer detection ring and a furnace tube. The computer and the multi-channel ultrasonic system control circuit are used for bidirectional signal transmission through a wireless network; the multi-channel ultrasonic system control circuit is in bidirectional connection with the motor driver board; the motor driver board is in bidirectional connection with the coreless motor and the rotating motor; the coreless motor is mechanically connected with the tube crawling machine; the rotating motor is mechanically connected with the multi-channel piezoelectric transducer detection ring; and the multi-channel ultrasonic system control circuit is in multi-channel unidirectional connection with the multi-channel piezoelectric transducers.

The multi-channel ultrasonic system control circuit, the motor driver board, the multi-channel piezoelectric transducer detection ring and a motor system are mounted on the tube crawling machine, and the computer is arranged at any position beside a to-be-detected furnace tube and is within a range of 50 m away from the furnace tube.

The computer is responsible for wirelessly sending detection instructions and storing, processing and displaying echo data; and the detection instructions comprise control of excitation channel frequency, repetition frequency, gain, sampling rate, sampling duration, motor speed, acceleration, deceleration and pulse number.

The multi-channel ultrasonic system control circuit is composed of a micro-processing unit, a wireless remote transceiver module, a power supply module, an excitation module, a receiving module, a program control gain amplification module, an acquisition module and a serial port communication module. The circuit modules are all connected with the micro-processing unit, wherein the wireless module, the program control gain amplification module, the acquisition module and the serial port communication module are in bidirectional connection with the micro-processing unit; and the input of the power supply module comes from a direct-current power supply provided by a hydrogen production furnace.

The motor driver board is responsible for receiving serial port information of the multi-channel ultrasonic system control circuit, generating PWM (Pulse-Width Modulation) waves to control the coreless motor and the rotating motor, receiving motion parameters fed back by two motor encoders and sending the motion parameters to the multi-channel ultrasonic system control circuit through a serial port.

The tube crawling machine is composed of a crawling mechanism, a circuit system, a rotating structure and the multi-channel piezoelectric transducer detection ring, and is responsible for the motion of the detection system on the outer wall of the hydrogen production furnace tube.

The multi-channel piezoelectric transducer detection ring is composed of a plurality of piezoelectric transducers, the number of the piezoelectric transducers is six, the six piezoelectric transducers are divided into three groups in pairs of excitation and receiving, and the piezoelectric transducers are fixed in the circumferential direction of the furnace tube and used for detecting the cracks on the inner wall of the hydrogen production furnace tube and receiving transmission echo signals of the creep cracks passing through the furnace tube.

According to the ultrasonic in-situ automatic detection system for creep cracks on the inner wall of the hydrogen production furnace tube, the working process of the system comprises the following steps:

powering on the system by +24 V, starting Wi-Fi by a wireless module of the multi-channel ultrasonic system control circuit to enter client SeriaNet, starting upper computer software by the computer to establish a server, connecting a system circuit with the server according to a preset IP address and a port number, and thus completing the establishment of the wireless mode of the detection system;

sending the detection instructions by the computer, after the detection instructions reach the multi-channel ultrasonic system control circuit from the computer through a wireless transmission mode, transmitting the instructions to the micro-processing unit through the wireless module, and sequentially adjusting the states of the system according to excitation, amplification, acquisition and motion parameter information in the detection instructions by the micro-processing unit;

judging the information of excitation frequency and excitation repetition frequency by the micro-processing unit, sending corresponding pulses to a field-effect transistor driver, and driving the field-effect transistor to conduct bipolar high-voltage pulses to excite the piezoelectric transducers to radiate ultrasonic signals;

a relative delay time later, after the transmission signals received by the piezoelectric transducers pass through a fixed-multiple operational amplifier, regulating and controlling receiving of a voltage control gain amplifier by the micro-processing unit, converting single-ended signals into differential signals, and inputting the differential signals into an analog-to-digital converter, and according to the detection instructions, sending a corresponding frequency clock signal to the analog-to-digital converter by the micro-processing unit and collecting parallel output data;

sending received echo signal data to the computer through the wireless remote transceiver module by the micro-processing unit in the multi-channel ultrasonic system control circuit according to the preset IP address and the port number, and receiving, storing, processing and displaying the echo signal data on a front panel of upper computer software by the computer;

during the processing of the ultrasonic system, sending the motion instruction to the serial port module according to detection instruction information by the micro-processing unit, after receiving the serial port information by the motor driving board, converting the instruction into PWM wave output, and controlling the speed, acceleration, deceleration, journey and forward and reverse rotation of the coreless motor in the detection process, and driving the rotating degree and the direction of the detection ring by the rotating motor when the system moves to the top end of the furnace tube;

in the detection process, feeding back the current motor running state to the multi-channel ultrasonic system control circuit by encoders of the coreless motor according to a serial port protocol at a certain time interval, and then sending the current motor running state to the computer through the wireless module; and under the control of the detection instructions, enabling the tube crawling machine to move from the lower end of the furnace tube to the upper end of the furnace tube, rotate by a certain angle and then move from the upper end to the lower end until detection and data storage of all channels in the detection instructions are completed, and thus ending the detection.

Compared with the prior art, the present disclosure has the following beneficial effects:

firstly, in-situ automatic detection of creep cracks on the inner wall of the furnace tube is realized by utilizing the multi-channel detection ring and rotating the angle to radiate ultrasonic waves to the furnace tube in the full circumferential direction, one-tube full-coverage scanning can be realized in a furnace shutdown state, and detection personnel do not need to repeatedly detach the device to replace the detection position, and the position parameters do not need to be continuously adjusted in the detection process, so that the detection complexity is greatly reduced, and the detection efficiency is improved;

secondly, the detection instructions and the signals are transmitted in a wireless mode, redundant cables are not needed to increase the motion burden of the tube crawling machine, the detection process can be remotely controlled through the computer in the whole process, and a battery can be mounted on the tube crawling machine under necessary conditions to realize zero-cable tube crawling detection; and thirdly, aiming at the condition that the quality detection cost of whole furnace shutdown is relatively high, the system greatly improves the detection efficiency and solves the problem of in-situ automatic detection of the hydrogen production furnace tube.

DETAILED DESCRIPTION OF THE EMBODIMENTS

The ultrasonic in-situ automatic detection system for creep cracks on the inner wall of a hydrogen production furnace tube in the present disclosure is further described below in combination with the embodiments and attached figures. The structural schematic diagram of the ultrasonic in-situ automatic detection system for creep cracks on the inner wall of the hydrogen production furnace tube adopted in the embodiment is as shown in FIGS. 1A and 1B, the system completely covers the circumference of the whole furnace tube, the number of required piezoelectric transducers is six according to tests, the six piezoelectric transducers are divided into three groups in pairs of excitation and receiving, and excitation and receiving SMA heads on the multi-channel ultrasonic system control circuit are correspondingly connected to the piezoelectric transducers.

Figure 1A:
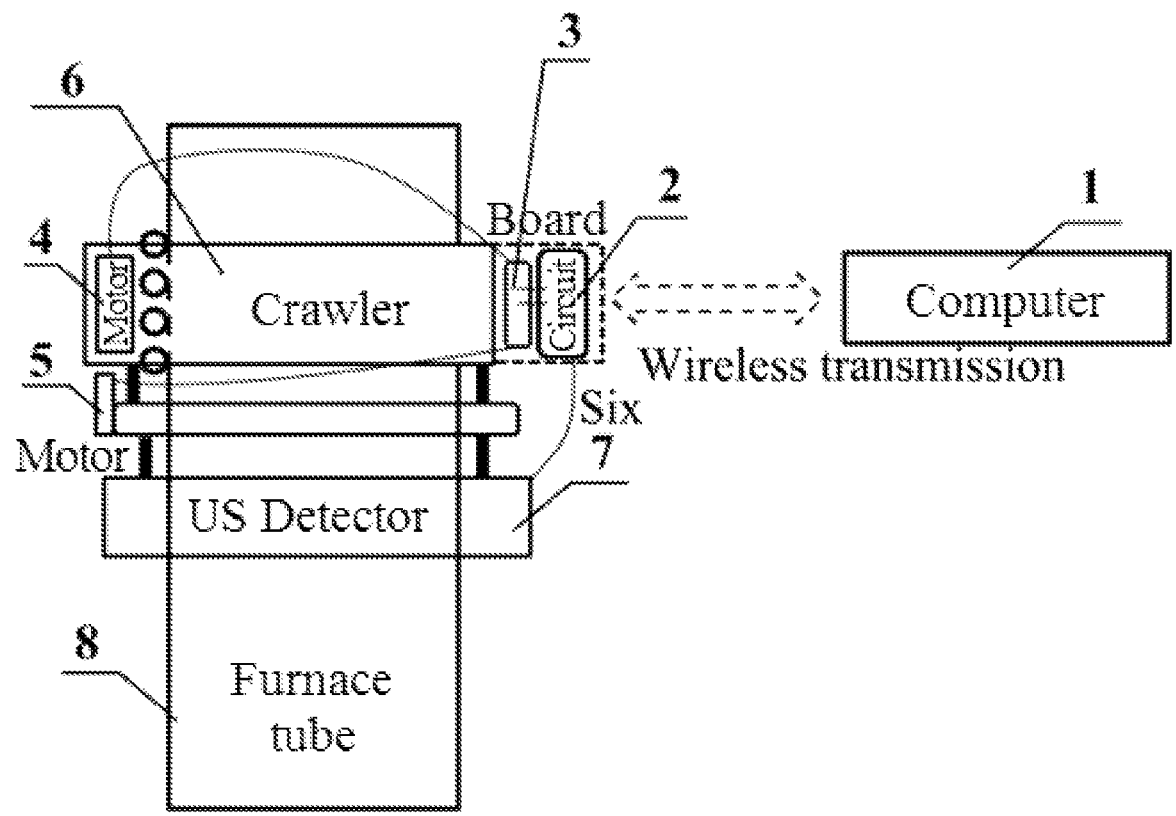
FIG. 1A is a front view of an ultrasonic in-situ automatic detection system for creep cracks on the inner wall of a hydrogen production furnace tube.
Figure 1B:
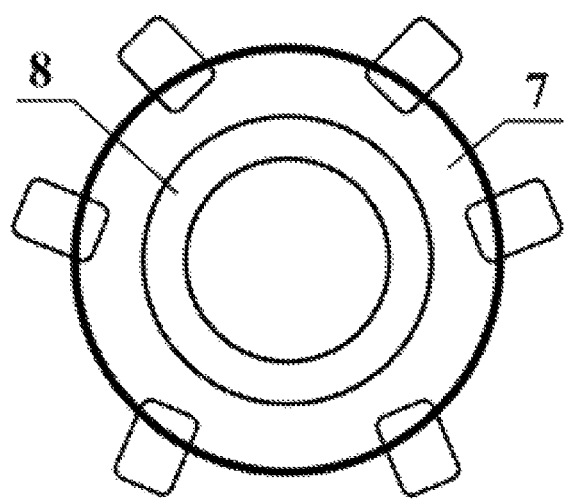
FIG. 1B is a bottom view of the ultrasonic in-situ automatic detection system for creep cracks on the inner wall of the hydrogen production furnace tube.

As shown in FIGS. 1A and 1B, the ultrasonic in-situ automatic detection system for creep cracks on the inner wall of a hydrogen production furnace tube in the present disclosure comprises a computer 1, a multi-channel ultrasonic system control circuit 2, a motor driver board 3, a coreless motor 4, a rotating motor 5, a tube crawling machine 6, a multi-channel piezoelectric transducer detection ring 7 and a furnace tube 8. The computer 1 is connected with the multi-channel ultrasonic system control circuit 2 through a Wi-Fi wireless module for bidirectional signal transmission; the multi-channel ultrasonic system control circuit 2 is in bidirectional connection with the motor driver board 3 through a Dupont line to transmit RS232 level signals; the motor driver board 3 is in bidirectional cable connection with the coreless motor 4 and the rotating motor 5; and the coreless motor 4 is mechanically connected with the tube crawling machine 6, and the rotating motor 5 is mechanically connected with the multi-channel piezoelectric transducer detection ring 7.

The multi-channel ultrasonic system control circuit 2 and the motor driver board 3 are mounted to the motion structure side of the tube crawling machine, and the multi-channel piezoelectric transducer detection ring 7 is arranged below the tube crawling machine and mechanically connected with the tube crawling machine. The computer 1 is arranged at a position which is convenient for detection personnel to control and is 50 m away from a to-be-detected pipeline.

The computer 1 is responsible for sending detection instructions: the gain is 40 dB, the excitation frequency is 1 MHz, the repetition excitation frequency is 5 Hz, the sampling frequency is 50 MHz, the motor speed is 20 mm/s, and then echo data are stored, processed and displayed.

The Wi-Fi wireless module is responsible for communicating between the computer 1 and the multi-channel ultrasonic system control circuit 2, transmitting the detection instructions issued by the computer 1 to the multi-channel ultrasonic system control circuit 2 and returning the echo data collected by the circuit and motor state parameters.

Figure 2:
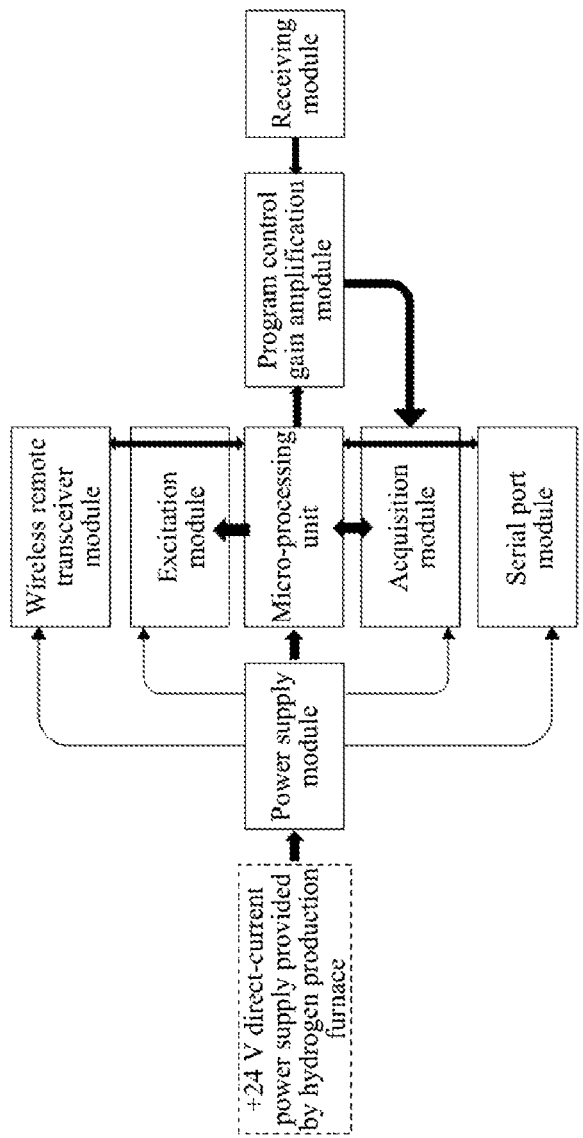
FIG. 2 is a structural schematic diagram of a multi-channel ultrasonic system control circuit in the present disclosure.

The multi-channel ultrasonic system control circuit 2 is composed of a micro-processing unit, a Wi-Fi wireless module, a power supply module, an excitation module, a receiving module, a program control gain amplification module, an acquisition module and a serial port communication module, as shown in FIG. 2. The micro-processing unit is in bidirectional connection with the Wi-Fi wireless module, the acquisition module and the serial port communication module and is in unidirectional connection with the other modules; and the power supply module is connected with other modules; the input of the power supply module comes from a direct-current power supply +24V or a direct-current battery provided by a hydrogen production furnace.

Figure 3:
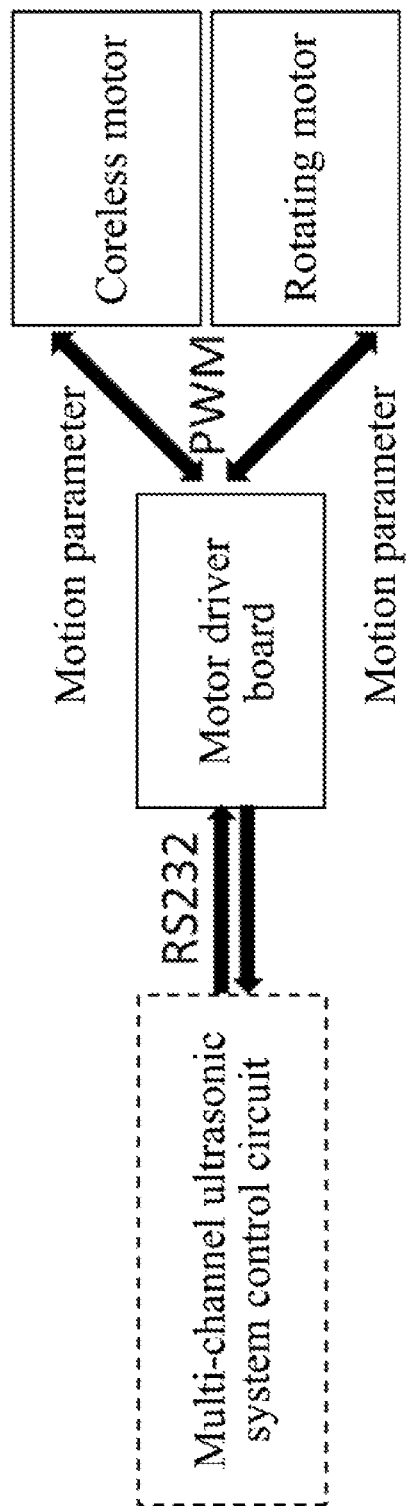
FIG. 3 is a structural schematic diagram of a motion control system in the present disclosure.

The connection structure of the motor driver board 3, the multi-channel ultrasonic system control circuit 2, the coreless motor 4 and the rotating motor 5 is as shown in FIG. 3. The motor driver board 3 and the multi-channel ultrasonic system control circuit 2 judge data frame headers, position the motor, specify the parameters and determine the size of the parameters through a preset protocol, and control the speed protocol of the coreless motor to be 16-ary: FFAA01A120, the speed protocol is decoded by a single chip microcomputer of the motor driver board 3 and then converted into PWM waves to be sent to the motor, and the rotating motor is in a similar way.

Figure 4:
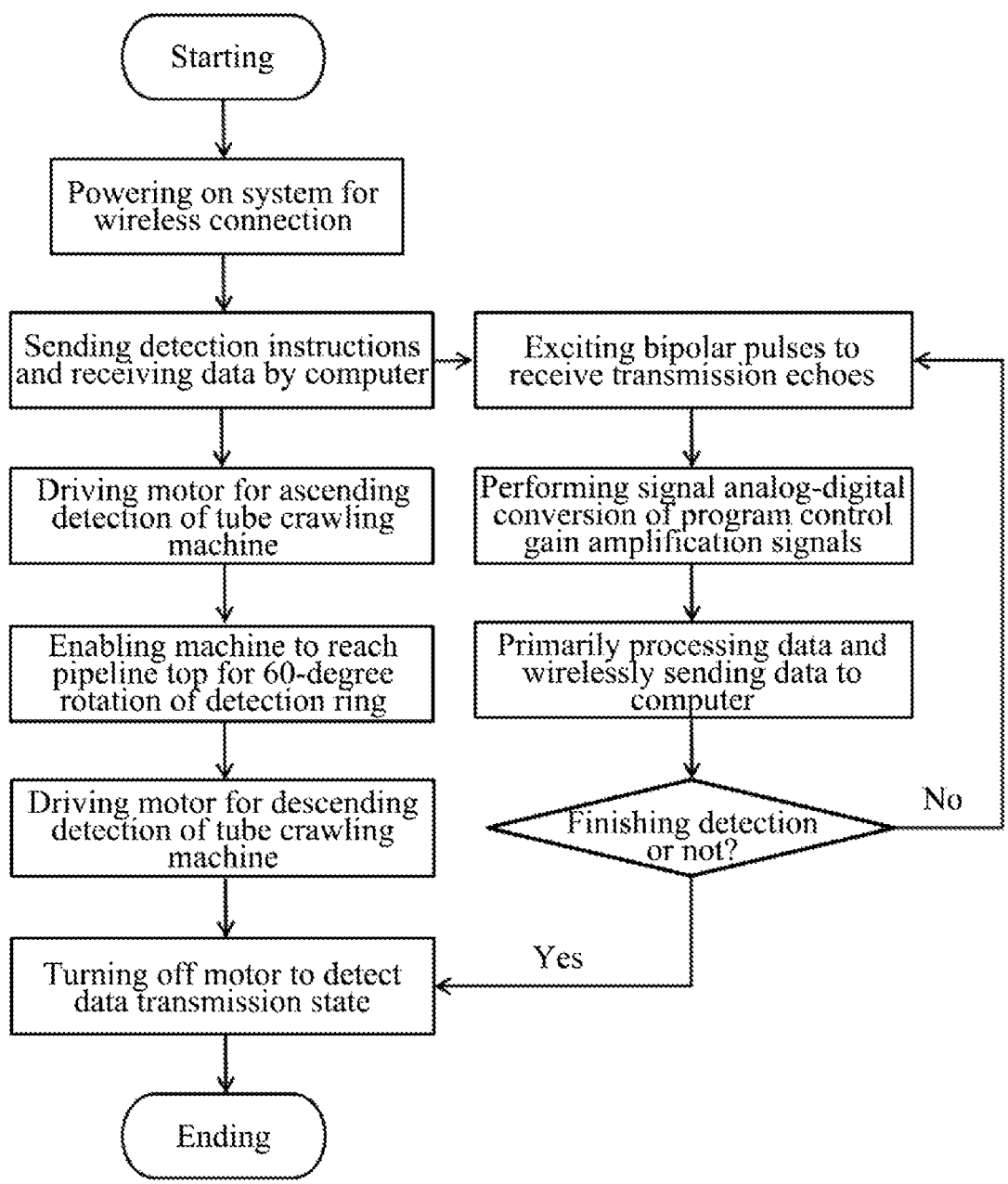
FIG. 4 is a work flow diagram of an ultrasonic in-situ automatic detection system for creep cracks on the inner wall of a hydrogen production furnace tube.

The working process of the system comprises the following steps, as shown in FIG. 4:

step one, powering on the system by +24 V, starting Wi-Fi by a wireless module of the multi-channel ultrasonic system control circuit 2 to enter TCP (Transmission Control Protocol) Client SeriaNet to detect a connectable server, connecting the computer with Wi-Fi and starting upper computer software to establish a TCP Server, connecting a system circuit with the server according to a preset IP address (192.168.4.2) and a port number (8088), and thus completing the establishment of the wireless mode of the detection system;

step two, presetting detection parameters by an upper computer, sending the detection instructions by the computer 1, after the detection instructions reach the multi-channel ultrasonic system control circuit 2 from the computer 1 through a wireless transmission mode in the first step, transmitting the instructions to the micro-processing unit through the wireless module, and sequentially adjusting the states of the system according to excitation, amplification, acquisition and motion parameter information in the detection instructions by the micro-processing unit;

step three, judging that the excitation frequency is 1 MHz and the excitation repetition frequency is 5 Hz by the micro-processing unit, sending 3.3 VTTL pulses to a field-effect transistor driver, and driving the field-effect transistor to conduct +/−150 V bipolar high-voltage pulses to excite the piezoelectric transducers to radiate ultrasonic signals;

step four, according to the propagation time 40 microseconds of the waves in the medium, after the transmission signals received by the piezoelectric transducers pass through a 20 dB operational amplifier, regulating and controlling receiving of a 20 dB program control gain amplifier by the micro-processing unit, converting single-ended signals into differential signals, and inputting the differential signals into a 12-bit analog-to-digital converter, and according to the detection instructions, sending a 50 MHz sampling clock to the analog-to-digital converter by the micro-processing unit and collecting parallel output data;

step five, sending received echo signal data to the computer 1 through the Wi-Fi wireless module in a TCP connection mode in the first step by the micro-processing unit in the multi-channel ultrasonic system control circuit 2, and receiving, storing, processing and displaying the echo signal data on a front panel of upper computer software by the computer 1;

step six, during the processing of the ultrasonic system, sending the motion instruction (the coreless motor drives the tube crawling machine to crawl at a speed of 20 mm/s: FFAA01A120) of 3.3 VTTL to RS232 level to the serial port module according to detection instruction information by the micro-processing unit, after receiving the serial port information by the motor driving board 3, converting the instruction into PWM output, and controlling the speed, acceleration, deceleration, journey and forward and reverse rotation of the coreless motor 4 in the detection process, and driving the multi-channel piezoelectric transducer detection ring 7 to rotate clockwise by 60° by the rotating motor 5 when the system moves to the top end of the furnace tube 8;

step seven, in the detection process, feeding back the current motor running state to the multi-channel ultrasonic system control circuit 2 by encoders of the coreless motor 4 according to a serial port protocol (the current speed 30 mm/s feedback protocol of the coreless motor: AAFF01B130) at the frequency of 1 time per second, and then sending the current motor running state to the computer 1 through the wireless module; and step eight, under the control of the detection instructions, enabling the tube crawling machine 6 to move from the lower end of the furnace tube 8 to the upper end of the furnace tube 8, rotate by 60° and then move from the upper end to the lower end until detection and data storage of all channels in the detection instructions are completed, and thus ending the detection.

What is claimed is:

1. An ultrasonic in-situ automatic detection system for creep cracks on an inner wall of a hydrogen production furnace tube, the detection system comprising:
   a computer,
   a multi-channel ultrasonic system control circuit configured to communicate with the computer using Transmission Control Protocol (TCP) full duplex signal transmissions through a Wi-Fi wireless network,
   a motor driver board configured to communicate bidirectionally with the multi-channel ultrasonic system control circuit,
   a coreless motor and a rotating motor, both configured to communicate bidirectionally with the motor driver board;
   a tube crawling machine mechanically connected with the coreless motor,
   a multi-channel piezoelectric transducer detection ring configured to communicate bidirectionally with the multi-channel ultrasonic system control circuit and mechanically connected with the rotating motor;
   wherein the multi-channel ultrasonic system control circuit, the motor driver board, the multi-channel piezoelectric transducer detection ring and a motor system are mounted on the tube crawling machine,
   wherein the computer is within a range of 50 m from the hydrogen production furnace tube;
   wherein the computer is configured to wirelessly send detection instructions and store, process and display echo data; and
   wherein the detection instructions comprise control of an excitation channel frequency, a repetition frequency, gain, a sampling rate, a sampling duration, a motor speed, an acceleration, a deceleration and a pulse number.

2. The ultrasonic in-situ automatic detection system for creep cracks on an inner wall of a hydrogen production furnace tube according to claim 1, wherein the multi-channel ultrasonic system control circuit comprises:
   a micro-processing unit; and
   a plurality of modules comprising a wireless remote transceiver module, a power supply module, an excitation module, a receiving module, a program control gain amplification module, an acquisition module and a serial port communication module;
   wherein the plurality of modules are connected with the micro-processing unit,
   wherein the wireless remote transceiver module, the program control gain amplification module, the acquisition module and the serial port communication module are configured to communicate bidirectionally with the micro-processing unit; and
   wherein an input of the power supply module is configured to receive power from a direct-current power supply provided by a hydrogen production furnace.

3. The ultrasonic in-situ automatic detection system for creep cracks on an inner wall of a hydrogen production furnace tube according to claim 1, wherein the motor driver board is configured to receive serial port information of the multi-channel ultrasonic system control circuit, generate PWM (Pulse-Width Modulation) waves to control the coreless motor and the rotating motor, receive motion parameters fed back by two motor encoders, and send the motion parameters to the multi-channel ultrasonic system control circuit through a serial port.

4. The ultrasonic in-situ automatic detection system for creep cracks on an inner wall of a hydrogen production furnace tube according to claim 1, wherein the ultrasonic in-situ automatic detection system is configured to control the tube crawling machine to crawl along an outer wall of the hydrogen production furnace tube in a first direction; drive the multi-channel piezoelectric transducer detection ring to rotate by a target angle, control the tube crawling machine to crawl along the outer wall of the hydrogen production furnace tube in a second direction opposite the first direction, and complete a scanning of the hydrogen production furnace tube.

\* \* \* \* \*